(12) United States Patent
Ginestra (10) Patent No.: US 10,570,346 B2
(45) Date of Patent: *Feb. 25, 2020

(54) EBULLATED BED PROCESS FOR HIGH CONVERSION OF HEAVY HYDROCARBONS WITH A LOW SEDIMENT YIELD

(71) Applicant: SHELL OIL COMPANY, Houston, TX (US)

(72) Inventor: Josiane Marie-Rose Ginestra, Richmond, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,964

(22) Filed: Apr. 24, 2017

(65) Prior Publication Data

US 2017/0306248 A1 Oct. 26, 2017

Related U.S. Application Data

(60) Provisional application No. 62/327,082, filed on Apr. 25, 2016.

(51) Int. Cl.
| | | |
|---|---|---|
| *C10G 47/24* | (2006.01) |
| *C10G 47/04* | (2006.01) |
| *B01J 35/02* | (2006.01) |
| *B01J 35/10* | (2006.01) |
| *B01J 37/08* | (2006.01) |
| *B01J 37/00* | (2006.01) |
| *B01J 23/883* | (2006.01) |
| *B01J 27/19* | (2006.01) |

(52) U.S. Cl.
CPC ............ *C10G 47/24* (2013.01); *B01J 23/883* (2013.01); *B01J 27/19* (2013.01); *B01J 35/023* (2013.01); *B01J 35/026* (2013.01); *B01J 35/108* (2013.01); *B01J 35/1042* (2013.01); *B01J 35/1066* (2013.01); *B01J 35/1071* (2013.01); *B01J 37/0009* (2013.01); *B01J 37/08* (2013.01); *C10G 47/04* (2013.01); *C10G 2300/202* (2013.01); *C10G 2300/208* (2013.01); *C10G 2300/70* (2013.01)

(58) Field of Classification Search
CPC ........ C10G 47/02; C10G 47/04; C10G 47/24; B01J 35/026; B01J 35/1066; B01J 35/1071
See application file for complete search history.

(56) References Cited

U.S. PATENT DOCUMENTS 3,990,964 A * 11/1976 Gustafson ............... B01J 35/026
208/216 PP
4,454,026 A * 6/1984 Hensley, Jr. ............. B01J 23/28
208/216 PP

(Continued)

*Primary Examiner* — Renee Robinson
(74) *Attorney, Agent, or Firm* — Charles W. Stewart (57) ABSTRACT

An ebullated bed process for the hydroconversion of heavy hydrocarbon feedstocks that provides for high conversion of the heavy hydrocarbon with a low sediment yield. The process uses for its catalyst bed small particles of a specifically defined shaped hydroprocessing catalyst which is contacted with the heavy hydrocarbon feedstock under hydroconversion conditions and yields a hydrocarbon conversion having a relatively low sediment content.

9 Claims, 4 Drawing Sheets

(56) References Cited

U.S. PATENT DOCUMENTS

| | | | | |
|---|---|---|---|---|
| 4,549,957 A | * | 10/1985 | Hensley, Jr. | B01J 23/28 208/216 PP |
| 7,491,313 B2 | * | 2/2009 | Toshima | B01J 21/12 208/111.3 |
| 2004/0050754 A1 | * | 3/2004 | Abe | B01J 23/85 208/216 PP |
| 2004/0238411 A1 | * | 12/2004 | Abe | B01J 23/85 208/216 PP |
| 2013/0306517 A1 | * | 11/2013 | Kester | B01J 35/1019 208/89 |
| 2014/0027344 A1 | * | 1/2014 | Harris | C10G 47/12 208/61 |

* cited by examiner

EBULLATED BED PROCESS FOR HIGH CONVERSION OF HEAVY HYDROCARBONS WITH A LOW SEDIMENT YIELD

The present application claims the benefit of U.S. Provisional Application Ser. No. 62/327,082, filed 25 Apr. 2016, the entire disclosure of which is hereby incorporated by reference.

The invention relates to a process that uses an ebullated bed reactor system for the hydroconversion and hydroprocessing of a heavy hydrocarbon feedstock providing for high conversion with low sediment yield.

The present invention further relates to a process for treating heavy hydrocarbon oils containing large amounts of impurities such as sulfur, micro carbon residue (MCR), metals, nitrogen, and asphaltenes to effect hydrodesulfurization (HDS), hydrodemetallisation (HDM), hydrodenitrification (HDN), micro carbon residue reduction, asphaltene reduction, and/or conversion of heavy hydrocarbons to lighter products while yielding relatively low amounts of sediment in the treated product.

There are many processes that provide for the hydrotreatment and conversion of heavy oil feedstocks including the conversion of asphaltenes contained in the heavy oil. One problem associated with these processes is that the conversion of asphaltenes and heavy hydrocarbons to lighter hydrocarbons is usually accompanied by the undesirable formation of sediment. Sediment is a deposit which can be measured by the Shell Hot Filtration Solid Test (SHFST) describe by Van Kerknoort et al., *J. Inst. Pet.*, 37, pages 596-604 (1951) or by testing method ASTM-4870. Sediment generally comprises hydrocarbon species having an atmospheric boiling temperature of at least 340° C.

Numerous processes have been proposed in the art to solve the problem of sediment formation that results from the hydroprocessing and conversion of heavy hydrocarbon oils. For instance, U.S. Pat. No. 7,491,313 discloses a two-step process that provides for upgrading of heavy hydrocarbon oil while inhibiting sediment formation. In this process, a first catalyst of the first step provides for demetallization of and asphaltene removal from the heavy oil, and an independently selected second catalyst of the second step, having a different composition and pore size distribution from those properties of the first catalyst, provides for desulfurization and hydrogenation of the heavy oil while inhibiting sediment formation due to precipitation of asphaltenes. The catalysts of the two-step process are supported on spherical, cylindrical, or polylobal shaped carrier particles that are impregnated with the metals. The particles have a diameter in the range of from about 0.5 mm to about 10 mm, but it is preferred for the diameter to be from about 0.7 mm to about 1.2 mm and the length to be from about 2 mm to about 10 mm. Cylindrical particles are indicated as preferred for use in ebullated bed operations; but, there are no teachings within the '313 patent regarding benefits from the use of specific shapes and sizes of the polylobes.

US Pub. No. 2013/0306517 discloses a novel catalyst composition having a unique combination of features, which include an unusual shape, a specific pore structure, and a high surface area, that gives a catalyst having a high hydrodesulfurization activity and provides for high conversation of heavy oil feeds with low sediment yield. The catalyst is a co-mulled composition as opposed to an impregnated composition. The catalyst particles are preferably non-cylindrical extrudates with a cross section defined by three or four lobes and by an outer circle of diameter $D_o$ and an inner circle of diameter $D_I$. The extrudates are further defined by their length or height, H. The $D_o$ is between 0.75 and 2.0 millimeters and the ratio of $D_o$ to $D_I$ is between 1.5 to 3.0. The shapes of the lobes are truncated and semi-circular with rounded intersections. The diameter of the inner circle of the particles result from connecting the innermost points of the particle crenellations.

One process that is especially useful in processing and conversion of heavy hydrocarbon feedstocks is the ebullated bed process that uses an ebullated bed reactor system. In these systems, the heavy hydrocarbon feed is introduced in an upflow direction at the bottom of a catalyst bed contained within an ebullated bed reaction zone in a manner so as to lift or expand the catalyst bed to thereby form a fluidized bed of the catalyst. The heavy hydrocarbon passes through the expanded bed of catalyst into a separation zone (upper zone) wherein the product is separated from the catalyst and liquid hydrocarbon. The liquid hydrocarbon passes through a downcomer to a recycle ebullation pump and is recycled and reused in the expansion of the catalyst bed.

Use of the ebullated bed process in the conversion of heavy hydrocarbons can, however, yield conversion products having significant concentrations of sediment. There is a continuing need to provide improved ebullated bed processes that provide for the hydrotreatment and hydroconversion of heavy hydrocarbon oils but with a low or inhibited yield of sediment in the treated conversion product.

Accordingly, provided is a process that uses an ebullated bed reactor system for the hydroconversion of a heavy hydrocarbon feedstock providing high conversion of the heavy hydrocarbon feedstock with a low sediment yield. The inventive process comprises introducing the heavy hydrocarbon feedstock into an ebullated bed reaction zone contained within a reactor volume defined by an ebullated bed reactor vessel. The reactor volume includes an upper zone above the ebullated bed reaction zone and a lower zone below the ebullated reaction zone. The ebullated bed reaction zone comprises a catalyst bed of shaped hydroprocessing catalyst particles having a geometry providing for a first ratio of the cross section perimeter-to-cross sectional area that is in the range of from 5 $mm^{-1}$ to 8 $mm^{-1}$. The heavy hydrocarbon feedstock is contacted under hydroconversion reaction conditions with the shaped hydroprocessing catalyst particles within the ebullated bed reaction zone, and a heavy hydrocarbon conversion product having a low sediment content is yielded from the upper zone.

The inventive process provides for hydroprocessing of heavy hydrocarbon feedstocks that typically contain contaminating concentrations of organic sulfur, nitrogen and metal compounds as well as containing asphaltenes. The heavy hydrocarbon feedstock may be derived from crude oil or tar sand hydrocarbon materials comprising a major portion of hydrocarbons boiling at temperatures exceeding 343° C. (650° F.).

The process is particularly useful in treating heavy hydrocarbon feedstocks that have especially high proportions of pitch hydrocarbons that boil at temperatures exceeding 524° C. (975° F.). In this embodiment of the process, the portion of the heavy hydrocarbon feedstock comprising pitch exceeds 50 wt. % of the heavy hydrocarbon feedstock and the process provides for a significant conversion of the pitch hydrocarbons to hydrocarbons having boiling temperatures below 524° C. (975° F.) but with a comparatively low yield of sediment. Indeed, this is one of the unexpected features of the inventive process in that the use of an ebullated bed reactor system, which includes a catalyst bed of shaped hydroprocessing catalyst particles of a specifically defined geometry as described herein, provides for a high conversion of the heavy hydrocarbon feedstock but with a low sediment yield.

It is unexpected that the application and use of the small-size, shaped hydroprocessing catalyst particles, characterized by cross section perimeter-to-cross sectional area in the range of from 5 $mm^{-1}$ to 8 $mm^{-1}$ with their unique trilobal geometry, as a part of the catalyst bed of an ebullated bed reactor system contributes to a significant reduction in sediment that is yielded and contained in the heavy hydrocarbon conversion product of the hydroprocessing and conversion process of the invention. It is an essential aspect of the inventive process that the catalyst particles making up the catalyst bed of ebullated bed reactor system have a specifically defined geometry as described in detail in this specification. It is believed that this particle geometry contributes to the observed reductions in sediment production as compared to the ebullated bed residue upgrading process that uses particles with a lower cross section perimeter-to-cross sectional area ratios, such as cylindrically-shaped catalysts or impregnated catalysts of any shape or large particle size catalysts. The present invention offers a practical solution for increasing the sediment control performance of a residue ebullated bed process.

The references herein to the geometry of the shaped catalyst particles of the invention is as defined by the geometry of the die openings of the extrusion die through which is passed the co-mulled mixture of the catalyst of the inventive process to form the shaped hydroprocessing catalyst. It is noted that extruded catalyst pellet diameter size decreases with drying and calcining of the pellets. The particles or pellets of the shaped catalyst of the invention are formed by passing the co-mulled mixture through openings of an extrusion die having a geometry as further described herein. As the extrusion mixture passes through the extrusion die openings it breaks into random lengths usually in the range of from 0.1 mm to 10 mm, with an average particle length in the range of from 1 mm to 5 mm. It is also noted that further breakage of the particles may occur when they are used in the ebullated bed reactor.

The trilobe has a trilobe diameter that is in the range of from 0.5 mm to 1.3 mm. To maximize the sediment control performance, it is preferred for the trilobe diameter to be as small as is possible; because, smaller nominal trilobe diameters correlate with favorable changes in the geometry of the shaped catalyst particle that contribute to the inhibition or reduction of sediment yield.

For instance, the ratio of the cross section perimeter-to-cross sectional area (P/A) of the particle increases with decreases in the particle size as reflected in its nominal diameter. It is believed that the combination of small particle size and specific particle geometry provide for the large hydrocarbon molecules of the pitch component of the heavy hydrocarbon feedstock to have easier access into the interior of the catalyst particles where they contact with the active catalytic sites and for the reaction products to more easily egress from the inside of the catalyst particles. It is surprising and unexpected that the geometry of the particles in some way provides or contributes to the reduction in sediment yield. This occurs even without necessarily improving either the kinetic parameters or conversions.

The shape of the hydrocarbon processing catalyst particle is more specifically characterized as having a trilobal cross section with a length or depth. The cross section is also characterized by a perimeter that is defined by the outer perimeters of three circles having equal radii (r), i.e., the radius of each circle is the same length as the radius of each of the other two circles, wherein, the circles are conjoined to form a unified shape. The centers (C) of each of the three circles are oriented in a spaced relationship to each other such that the distances (d) between the centers are equal. The distances between each center of the three circles can range from one radius (r) to two radii (2r). Thus, the outer perimeter of each of the three circles, in one extreme, can run tangent to the centers of each of the other two circles, and, in the other extreme, the outer perimeters of each of the three circles can run tangent to the outer perimeters of the other two circles to thereby provide an overlap of the circles or lobes, or the overlap of the circles can be at any point within the two extremes. The radius, r, should be in the range of from 0.1 mm to 1 mm.

Figure 1:
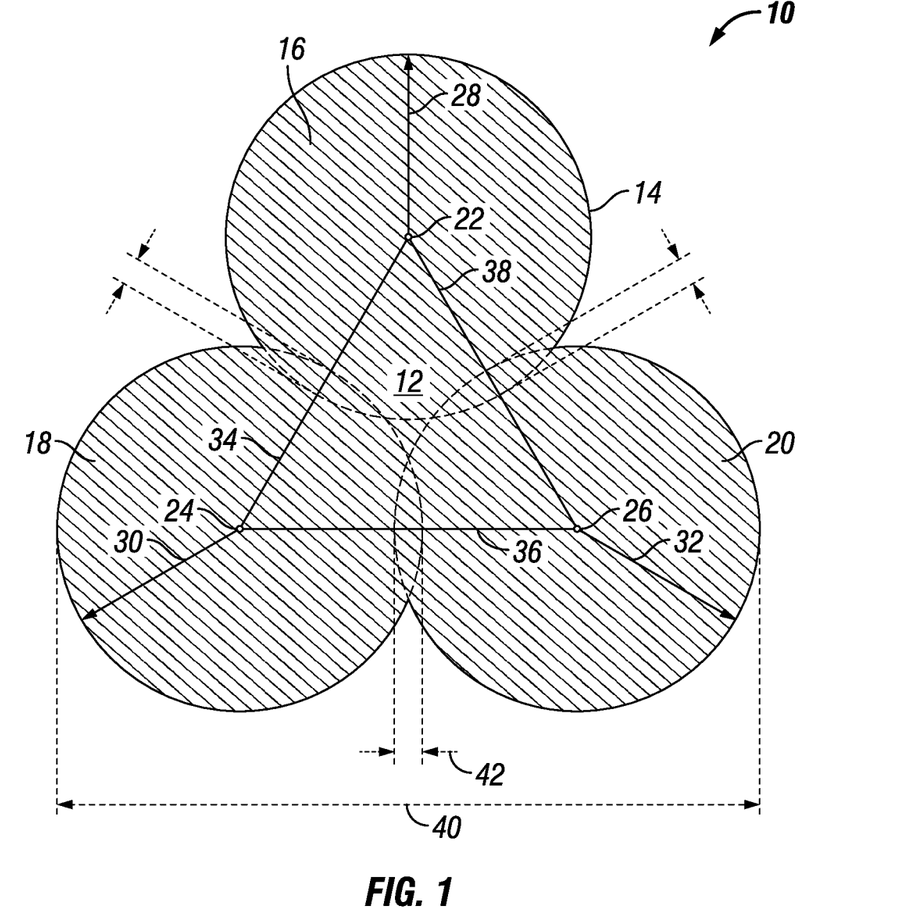
FIG. 1 is a view of the cross section of the extrusion die opening and shows the dimensions that define the extrusion die opening through which the co-mulled mixture of the catalyst composition is extruded to form one embodiment of a shaped hydroprocessing catalyst particle of the invention.

FIG. 1 presents a cross section of the extrusion die opening 10 used to make the shaped hydroprocessing catalyst particle of the invention having the depicted cross section 12. Cross section 12 is defined by its outer perimeter 14 of three conjoined circles 16, 18, and 20. Circles 16, 18, and 20 each are respectively defined by their centers 22, 24, and 26 and their radii 28, 30, and 32. Circles 16, 18, and 20 are oriented to each other in a spaced relationship such that distance 34, from center 22 to center 24, and distance 36, from center 24 to center 26, and distance 38, from center 26 to center 22 are equal. The trilobe diameter 40 is the length of the line defined by the two centers 24 and 26 respectively of circles 18 and 20 and which extends to the outer perimeters of circle 18 and circle 20. The lobe overlap 42 is the length of the overlap of the two circles 18 and 20. The trilobe diameter may also be defined with respect to circles 20 and 16 and with respect to circles 16 and 18 since the dimensions in all respects are the same.

Figure 2:
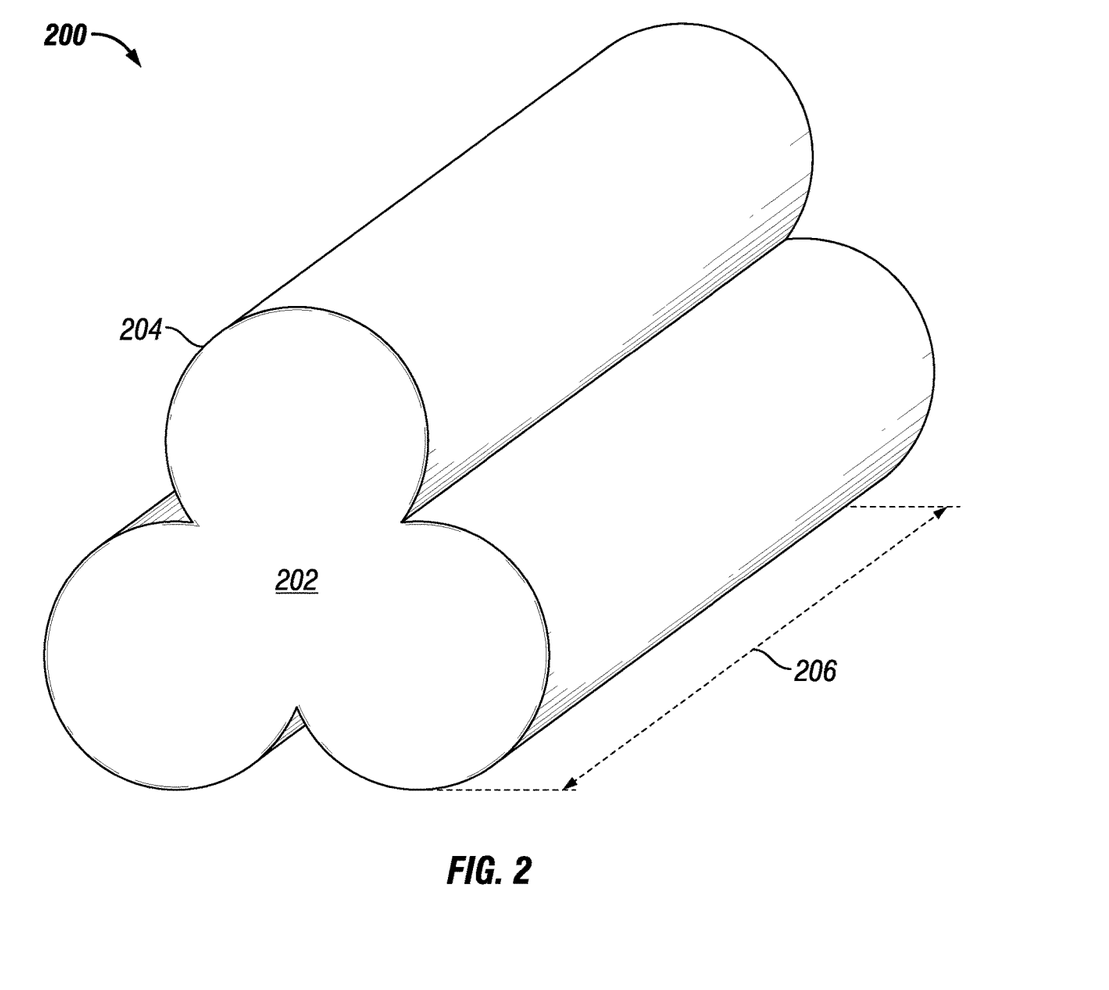
FIG. 2 is a perspective view of an embodiment of a shaped hydroprocessing catalyst particle of the invention made by passing the co-mulled mixture through the extrusion die opening of FIG. 1.

FIG. 2 presents a perspective view of the shaped hydroprocessing catalyst particle 200 that is an essential element of the catalyst bed of the ebullated bed reaction zone contained within the reactor volume defined by the ebullated bed reactor vessel of the system of the inventive process. Shaped hydroprocessing catalyst particle 200 has a cross section 202 which is defined by its perimeter 204 having a shape as imposed by the extrusion die opening that is shown in FIG. 1. Shaped hydroprocessing catalyst particle 200 has a trilobe particle length 206.

It is a feature of the inventive process for the shaped hydroprocessing catalyst particles of the catalyst bed of the ebullated bed reactor system to have a geometry that provides for a first ratio. The first ratio is defined by the particle outer perimeter divided by the cross sectional area of the particle cross section (i.e., cross section perimeter-to-cross sectional area). It further is critical for the shaped hydroprocessing catalyst particle to have a first ratio that is within the range of from 5 mm$^{-1}$ to 8 mm$^{-1}$. It is, however, preferred for the first ratio to be in the range of from 5 mm$^{-1}$ to 7 mm$^{-1}$, and, most preferred, the first ratio is from 6 mm$^{-1}$ to 7 mm$^{-1}$.

As noted above, the shaped catalyst particles have a trilobe diameter that is in the range of from 0.7 mm to 1.2 mm, but preferably, the nominal trilobe diameter is in the range of from 0.8 mm to 1.2 mm, and, more preferably, from 0.8 mm to 1 mm. It is recognized that there is a direct relationship between the sediment yield provided by the catalyst and its trilobe diameter and that it is desirable for the nominal trilobe diameter of the shaped catalyst particle to be as small as is feasible. The mechanical integrity requirements of the shaped particle, however, place limitations on its small size.

As has been described above, the shaped particle can have a trilobe particle length that is in the range of from 0.1 mm to 10 mm with a particle length distribution such that the average length is in the range of from 1 mm to 5 mm. The trilobe particle length is significant in that it impacts another important characteristic of the shaped hydroprocessing catalyst particle geometry that provides for a second ratio which is defined by the particle external surface area divided by the particle volume (i.e., surface area-to-volume ratio). Due to the random length distribution of the catalyst extrudates and the typical change in length distribution throughout the catalyst life, it is more difficult to estimate the surface area-to-volume ratio than the first ratio of cross section perimeter-to-cross sectional area. The second ratio, however, should be in the range of from 5 mm$^{-1}$ to 15 mm$^{-1}$, preferably, from 5.5 mm$^{-1}$ to 12 mm$^{-1}$, and, most preferably, from 6 mm$^{-1}$ to 10 mm$^{-1}$.

The following Table 1 presents a summary of geometric parameters that define various embodiments of the shaped hydroprocessing catalyst particle of the invention.

TABLE 1

Dimensions for Geometric Parameters that Define the Shaped Catalyst of the Inventive Process

| | Narrow | Intermediate | Broad |
|---|---|---|---|
| trilobe diameter (mm) | 0.8-1 | 0.75-1.1 | 0.7-1.3 |
| average trilobe particle length (mm) | 2-4 | 1.5-4.5 | 1-5 |
| Radius of circles of trilobes (mm) | 0.4-0.75 | 0.38-0.78 | 0.35-0.8 |
| First ratio (cross section perimeter-to-cross sectional area) (mm$^{-1}$) | 6-7 | 5-7 | 5-8 |
| Second ratio (trilobe cross sectional area-to-trilobe particle volume) (mm$^{-1}$) | 6-10 | 5.5-12 | 5-15 |
| Distance between centers of trilobe circles (r) | r | 1.5r | 2r |

A further important feature of a preferred embodiment of the inventive process is that it is a co-mulled, instead of an impregnated, composition. What is meant by the use of the term "co-mulled" is that the starting materials of the catalyst are commingled to form a mixture of the individual components that is preferably or substantially uniform or homogeneous. This term is intended to be broad enough in scope to include mixing of the starting materials that include an inorganic oxide material such as alumina, a nickel compound, and a molybdenum compound so as to yield a co-mulled mixture that can be formed into agglomerate particles. The co-mulled mixture can be a paste or a plastic mixture that is capable of being formed into agglomerate particles by any of the known agglomeration methods. Preferably, it is extruded into extrudate particles by any of the known extrusion methods.

The co-mulled mixture is formed by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batchwise or continuous mixers for mixing solids and liquids or for the formation of paste-like mixtures that are extrudable.

Suitable types of batch mixers include, but are not limited to, change-can mixers, stationary-tank mixers, double-arm kneading mixers that are equipped with any suitable type of mixing blade.

Suitable types of continuous mixers include, but are not limited to, single or double screw extruders, trough-and-screw mixers and pug mills.

The mixing of the starting materials used in the preparation of the co-mulled mixture can include water and appropriate amounts of a mineral acid, such as nitric acid, as is necessary to provide the aforementioned paste-like mixtures.

The time used for mixing the starting materials is a time period necessary to properly homogenize the co-mulled mixture. Generally, the blending time is in the range of upwardly to 12 or more hours. Typically, the blending time is in the range of from 0.02 hours to 1 hour.

The inorganic oxide component of the co-mulled mixture may be any suitable porous inorganic refractory oxide material that will provide the pore and surface structure properties required for the shaped hydroprocessing catalyst particles of the inventive process. Examples of possible suitable types of porous inorganic refractory oxides include silica, alumina, and silica-alumina. Preferred is either alumina or silica-alumina.

The amount of inorganic oxide material used to form the co-mulled mixture is such as to provide the shaped hydroprocessing catalyst particle having an amount of inorganic oxide that is in the range of from about 70 to about 99 weight percent (wt. %). Preferably, the amount of inorganic oxide material in the shaped hydroprocessing catalyst particle is in the range of from 78 to 97 wt. %, and, most preferably, from 83 to 96 wt. %. This weight percent is based on the total weight of the shaped hydroprocessing catalyst particle.

The molybdenum component is present in the calcined shaped hydroprocessing catalyst particle in an amount that is greater than 1 wt. % and in an amount that is less than 24 wt. % when calculated as an oxide. It is preferred, however, for the molybdenum component to be present in the shaped hydroprocessing catalyst particle in an amount in the range of from 3 wt. % to 15 wt. %, and, more preferred, from 4 wt. % to 12 wt. %. These weight percentages (wt. %) are based on the total weight of the calcined shaped hydroprocessing catalyst particle (i.e., the total weight includes the sum of all the individual components of the catalyst composition including the support material, metals, and any other components) and assuming that the molybdenum component is present in the oxide form, MoO$_3$, regardless of its actual form.

The nickel component is present in the shaped hydroprocessing catalyst particle in an amount up to 6 wt. %, when calculated as nickel oxide, NiO. It is preferred, however, for the nickel component to be present in the shaped hydroprocessing catalyst particle in an amount in the range of from 0.5 wt. % to 6 wt. %, and, more preferred, from 0.75 wt. % to 5 wt. %. These weight percentages (wt. %) are based on the total weight of the calcined shaped hydroprocessing catalyst particle (i.e., the total weight includes the sum of all the individual components of the catalyst composition including the support material, metals, and any other components) and assuming that the nickel component is present in the oxide form, NiO, regardless of its actual form.

The shaped hydroprocessing catalyst particle may also include a phosphorous component. The amount of the phosphorous component in the shaped hydroprocessing catalyst particle can be in the range up to about 6 wt. % (2.63 wt. % elemental phosphorous). Typically, the phosphorous component is present in the catalyst composition in the range of from 0.1 wt % to 5 wt. %, and, more preferred, from 0.2 wt. % to 4 wt. %. These weight percentages (wt. %) are based on the total weight of the calcined shaped hydroprocessing catalyst particle and assuming that the phosphorous component is present in the oxide form, $P_2O_5$, regardless of its actual form.

The nickel compound used in the preparation of the co-mulled mixture is any suitable nickel compound that is convertible to a nickel oxide form by calcination in air under the calcination conditions as defined herein. Possible suitable nickel compounds include nickel oxides, nickel carbonates, nickel hydroxides, and nickel nitrates. One particularly suitable nickel compound is nickel nitrate.

The molybdenum compound used in the preparation of the co-mulled mixture can be molybdenum oxide and any other suitable molybdenum compound that is convertible to a molybdenum oxide form by calcination in air under the calcination conditions as defined herein. Possible suitable molybdenum compounds include molybdenum oxides, molybdenum oxide hydrates and molybdates. One particularly suitable molybdenum compound is ammonium heptamolybdate.

To provide the final shaped hydroprocessing catalyst particle of the invention, the extrudate of the co-mulled mixture is dried and then calcined. The drying of the extrudate of the co-mulled mixture is not a critical step and is generally performed in air and at a drying temperature in the range of from 20° C. to 125° C. The time period for drying is any suitable time period that can provide the desired amount of drying.

Calcination of the extrudate of the co-mulled mixture provides for the conversion of the metal compounds to their oxide forms. The calcination of the extrudates of the co-mulled mixture is conducted in the presence of an oxygen-containing fluid, such as air, at a temperature and for a time period that are suitable for achieving the desired degree of calcination to provide the final catalyst composition of the invention. Generally, the calcination temperature is in the range of from 400° C. to 900° C., preferably, from 500° C. to 875° C., and more preferably, from 600° C. to 850° C. The calcination time period can be in the range of from 0.1 hour to 96 hours, preferably in the range of from 0.5 hour to 3 hours.

The pore structure of the shaped hydroprocessing catalyst is another of its properties that may be important to the performance of the inventive ebullated bed process in converting heavy hydrocarbon feedstocks while inhibiting sediment yield. It is desirable for the shaped catalyst to have sufficient macroporosity so as to contribute to the characteristically high conversion with low sediment yield provided by the inventive process. As the term is used in this specification, macroporosity means the percent of the total pore volume of the shaped catalyst that is contained within its pores having diameters greater than 350 angstroms (Å). Thus, the macroporosity of the shaped catalyst is typically at least or greater than 10%. It is preferred for the macroporosity to exceed 12%, and, more preferred, the macroporosity exceeds 15%.

The preferred heavy hydrocarbon feedstock has a boiling range such that at least 70 weight percent boils at a temperature exceeding 524° C. (975° F.), and, most preferably, at least 80 weight percent of the heavy hydrocarbon feedstock boils at a temperature exceeding 524° C. (975° F.).

The API gravity of the heavy hydrocarbon feedstock can range from about 0 to about 15, but, more specifically, the API gravity is in the range of from 0 to 10, and, more specifically, from 2 to 8.

The heavy hydrocarbon feedstock can have a Conradson carbon content, as determined by ASTM testing method D-189, exceeding 10 weight percent, and, more specifically, the Conradson carbon content is in the range of from 15 weight percent to 30 weight percent.

The heavy hydrocarbon feedstock of the inventive process typically includes high concentrations of sulfur and nitrogen compounds and metals, such as, nickel and vanadium.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 4 to 7 weight percent.

Regarding the nitrogen compounds contained in the heavy hydrocarbon feedstock, they are usually present in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.3 to 1 weight percent.

The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 40 ppmw to 300 ppmw.

The vanadium concentration in the heavy hydrocarbon feedstock can exceed 30 ppmw or it can exceed 75 ppmw. More specifically, the vanadium concentration in the heavy hydrocarbon feedstock can be in the range of from 100 ppmw to 1500 ppmw.

The process of the invention includes contacting the heavy hydrocarbon feedstock, preferably in the presence of hydrogen, with the shaped hydroprocessing catalyst under suitable hydroprocessing conditions within the ebullated bed reaction zone that is contained within a reactor volume defined by the ebullated bed reactor vessel of the ebullated bed reactor system. The inventive process provides for a high percentage conversion of the pitch component of the heavy hydrocarbon feedstock within a relatively reduced level of sediment yield with the heavy hydrocarbon conversion product.

Suitable hydroconversion conditions under which the heavy hydrocarbon feedstock is contacted with the hydroconversion catalyst can include a hydroconversion contacting temperature in the range of from about 316° C. (600° F.) to about 538° C. (1000° F.), a hydroconversion total contacting pressure in the range of from about 1000 psia to about 4,000 psia, which includes a hydrogen partial pressure in the range of from about 800 psia to about 3,000 psia, a hydrogen addition rate per volume of heavy hydrocarbon feedstock in the range of from about 2000 SCFB to about 10,000 SCFB, and a hydroconversion liquid hourly space velocity (LHSV) in the range of from about 0.1 hr$^{-1}$ to 5 hr$^{-1}$.

The preferred hydroconversion contacting temperature is in the range of from 316° C. (600° F.) to 510° C. (950° F.), and, most preferred, from 371° C. (700° F.) to 455° C. (850° F.). The preferred hydroconversion total contacting pressure is in the range of from 1000 psia to 3500 psia, most preferably, from 1,500 psia to 3,000 psia, with a preferred hydrogen partial pressure of from 1800 psia to 2,800 psia, and most preferred, from 2,000 psia to 2,500 psia. The LHSV is preferably in the range of from 0.2 hr$^{-1}$ to 4 hr$^{-1}$, and, most preferably, from 0.2 to 3 hr$^{-1}$. The hydrogen addition rate per volume of heavy hydrocarbon feedstock is preferably in the range of from 2000 SCFB to 8,000 SCFB, and, more preferably, from 3000 SCFB to 6,000 SCFB.

The inventive process uses an ebullated bed reactor system that includes the shaped hydroprocessing catalyst described herein to process a heavy hydrocarbon feedstock so as to provide for an exceptionally high percentage conversion of its pitch component and a heavy hydrocarbon conversion product having a comparatively low sediment content. The ebullated bed reactor system includes a reactor vessel which defines a reactor volume that contains an ebullated bed reaction zone, an upper zone above the ebullated bed reaction zone, and a lower zone below the ebullated bed reaction zone.

It is a necessary feature of the inventive process for the ebullated bed reaction zone to comprise a catalyst bed of the shaped hydroprocessing catalyst. The geometric features of the shaped hydroprocessing catalyst, when used as the catalyst of an ebullated bed reactor system, that, it is believed, provides for the significant reduction in the yield of sediment found in the heavy hydrocarbon conversion product.

The sediment typically yielded with the heavy hydrocarbon conversion product is less than 0.5 wt. %, and, preferably, it is less than 0.4 wt. %, as determined by testing method ASTM-4870. The inventive process, with its use of the shaped hydroprocessing catalyst as a necessary element of the ebullated bed reactor system, provides a heavy hydrocarbon conversion product having significantly lower sediment content than comparative systems that use cylindrically-shaped or large particle size or impregnated catalysts. The sediment content of the heavy hydrocarbon conversion product can even be less than 0.35 wt. % or less than 0.3 wt. %.

Figure 3:
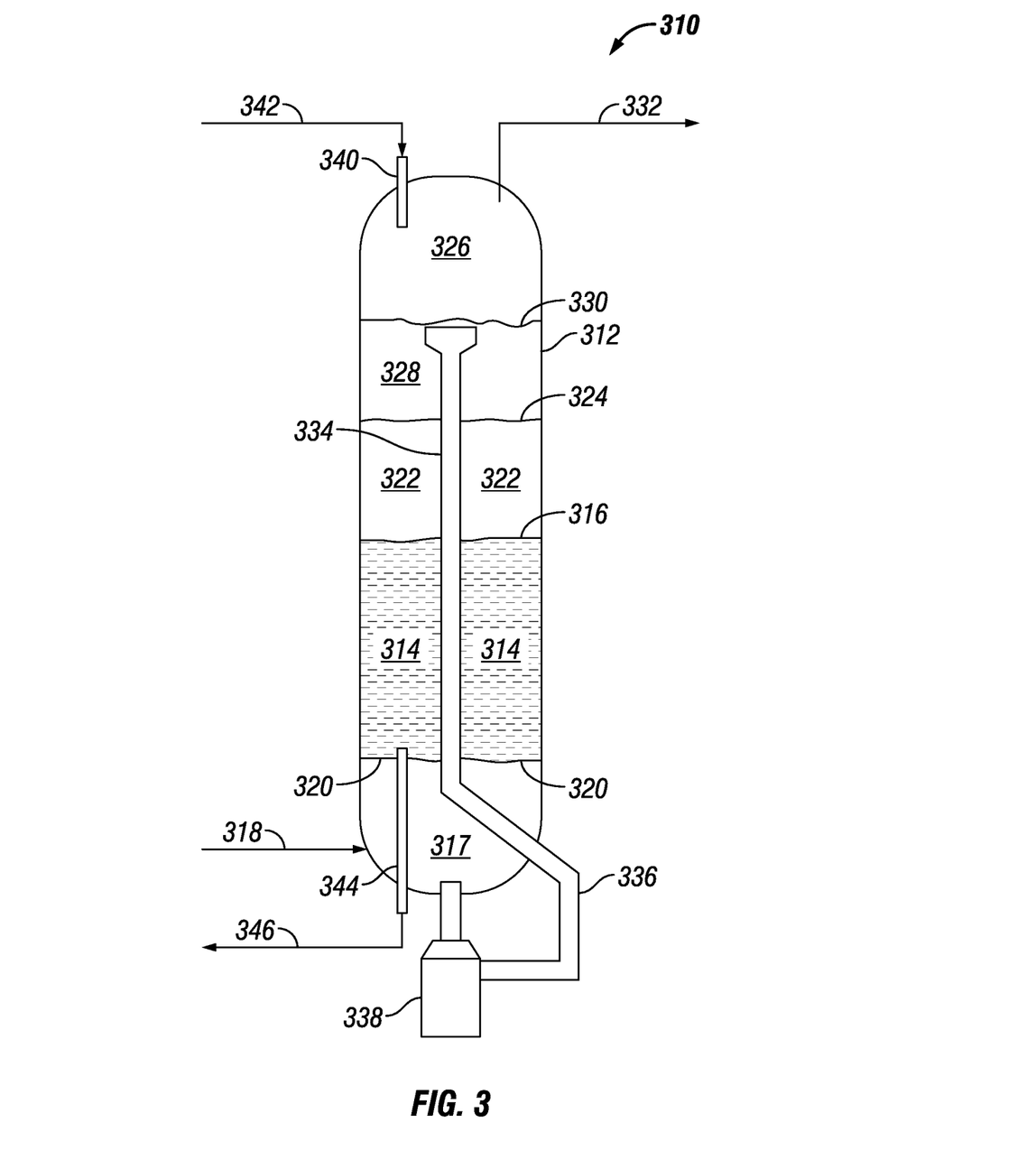
FIG. 3 is a simplified schematic representation of certain aspects of ebullated bed reactor system of the invention.

FIG. 3 presents a simplified schematic representation of an ebullated bed reactor system 310. The ebullated bed reactor system includes elongated vessel 312 that defines several zones such as a contacting zone for contacting a heavy hydrocarbon feedstock under suitable hydroconversion reaction conditions with a shaped hydroconversion catalyst and a separation zone for the separation of a hydrotreated heavy hydrocarbon product from the shaped hydroconversion catalyst.

Within elongated vessel 312 is a settled hydroconversion catalyst bed 314 having a settled hydroconversion catalyst bed level 316. A reactor feed comprising heavy hydrocarbon feedstock and hydrogen is introduced into lower zone 317 located below the ebullated catalyst bed within elongated vessel 312 by way of conduit 318.

The reactor feed passes through horizontal distributor plate 320 that provides means for directing the reactor feed upwardly and through settled hydroconversion catalyst bed 314. The passing of the reactor feed through settled hydroconversion catalyst bed 314 serves to lift and to expand the bed of shaped hydroconversion catalyst to thereby provide an expanded hydroconversion catalyst bed 322 (ebullated catalyst bed) having an expanded hydroconversion catalyst bed level 324.

In separation zone 326 of elongated vessel 312, hydroconversion catalyst is separated from liquid hydrocarbon 328, having a liquid level 330, and the heavy hydrocarbon conversion product, which passes from elongated vessel 312 by way of conduit 332.

Downcomer 334 within elongated vessel 312 provides conduit means for recycling the liquid hydrocarbon 328 to the bottom of expanded hydroconversion catalyst bed 322. Conduit 336 is operatively connected in fluid flow communication between downcomer 334 and ebullating pump 338. Ebullating pump 338 provides means for recycling and circulating the liquid hydrocarbon 328 through expanded hydroconversion catalyst bed 322.

The upper end of elongated vessel 312 includes catalyst inlet conduit means 340, which provides for the introduction of fresh hydroconversion catalyst while ebullated bed reactor system 310 is in operation. Fresh hydroconversion catalyst can be introduced into elongated vessel 312 through conduit means 340 by way of conduit 342. The lower end of elongated vessel 312 includes catalyst outlet conduit means 344, which provides for the removal of spent hydroconversion catalyst while ebullated bed reactor system 310 is in operation. The spent hydroconversion catalyst passes from elongated vessel 312 by way of conduit 346.

The following examples are presented to illustrate the invention, but they should not be construed as limiting the scope of the invention.

EXAMPLE 1

This Example 1 describes the preparation of a cylindrically shaped, co-mulled comparison Catalyst A and the co-mulled Catalyst B having the geometry of FIG. 1 and FIG. 2. This Example 1 also presents various of the properties of these catalysts.

A co-mulled mixture was prepared by mulling for 35 minutes 100 parts pseudo-boehmite powder, 2.25 parts of nitric acid, 22.3 parts of catalyst fines, 10.5 parts of nickel nitrate flakes, 6.8 parts of ammonium di-molybdate crystals, and 122.6 parts of water. An aliquot portion of the co-mulled mixture was then extruded through cylindrical extrusion holes, and an aliquot portion of the co-mulled mixture was extruded through trilobe extrusion holes having the geometry as depicted by FIG. 1. The extrudates were separately dried at 121° C. (250° F.) for 4 hours in an oven followed by calcination at 778° C. (1465° F.) for an hour in a static furnace to yield Catalyst A and Catalyst B.

Properties of these two catalysts are given in Table 6. Note that the catalysts were prepared by a single-step method, i.e., co-mulling, and have pore structures that include macropores.

TABLE 2

Properties of the Catalyst A and Catalyst B

|  | Catalyst A | Catalyst B |
|---|---|---|
| Pellet diameter, mm | 0.98 | 0.91 |
| Pellet shape | Cylinder | Trilobe |
| Average pellet length, mm | 3 | 3 |
| Pellet cross section perimeter/area | 4.08 | 6.50 |
| Pellet surface/volume | 4.75 | 7.17 |

TABLE 2-continued

Properties of the Catalyst A and Catalyst B

| | Catalyst A | Catalyst B |
|---|---|---|
| Total PV, cc/g | 0.812 | 0.807 |
| MPD, A | 100 | 102 |
| Vol >350 A, cc/g | 0.142 | 0.141 |
| Mo, wt % | 6.6 | 6.6 |
| Ni, wt % | 2.7 | 2.7 |
| P, wt % | 0.5 | 0.5 |

Figure 4:
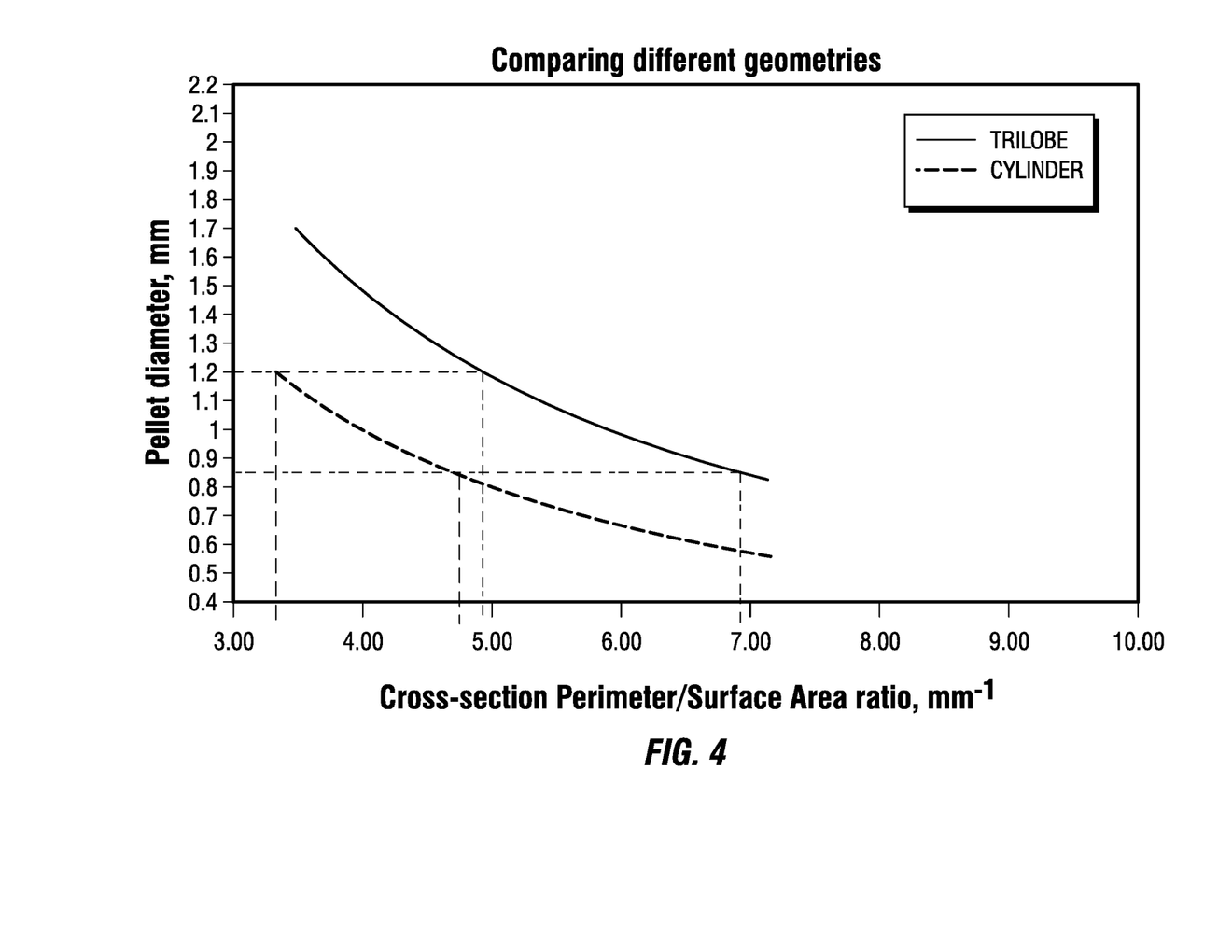
FIG. 4 includes plots of catalyst particle size as a function of the ratio of cross section perimeter per cross sectional area ($mm^{-1}$) for a cylindrical catalyst particle having a cylindrical geometry and a trilobal catalyst particle having the trilobal geometry of FIG. 1 with a showing of the effective range for the ratio that provides for a reduced sediment yield.

Presented in FIG. 4 are plots that compare certain properties of the cylindrical geometry of Catalyst A and the trilobal geometry of Catalyst B. The plots present the catalyst pellet size (mm) as a function of the ratio of the pellet cross section perimeter-to-cross sectional area ($mm^{-1}$). The pellet size for the cylinder is represented by the diameter of its cross section, and the pellet size for the trilobe is represented by the nominal trilobe diameter, as it is defined elsewhere herein. Also, shown on the graph of FIG. 4 is the range for the ratio of cross section perimeter-to-cross sectional area that is considered to be effective in providing for a significant reduction in sediment yield when such catalysts having the given geometry are used in ebullated bed reactor systems to process heavy hydrocarbon feedstocks as compared to the use of catalyst particles having a cylindrical geometry and the same values for its diameter.

For example, when a catalyst particle having the given trilobe geometry is used in an ebullated bed reactor system to process a heavy hydrocarbon feedstock, there is a reduced sediment yield with its product as compared to the use of catalyst particles having cylindrical geometry in an otherwise identical process. Exemplary performance results are presented in Example 2.

As may be observed from FIG. 4, the effective range for the ratio of the cross section perimeter-to-cross sectional area that is necessary to provide for the phenomenon described above is from about 5 $mm^{-1}$ to about 7 $mm^{-1}$. This range corresponds to a nominal trilobe diameter for the trilobe geometry that respectively is in the range of from about 1.2 mm to about 0.85 mm. On the other hand, use of the cylindrical particle having a diameter in the range of from 1.2 mm to 0.85 mm results in a much higher sediment yield than does the use of the trilobal particle having the same values for its nominal diameter.

EXAMPLE 2

This Example 2 describes the conditions of the performance testing of Catalyst A and Catalyst B and presents the test results of the performance testing.

These catalysts were tested in a two-stage CSTR pilot plant. Feed properties are summarized in Table 3 and process conditions are presented in Table 4.

TABLE 3

Properties of the feed used to evaluate the catalysts

| 1050 F.+, wt % | 76.43 |
|---|---|
| SULFUR, wt % | 3.058 |
| MCR, wt % | 19.1 |
| NICKEL, wppm | 67 |
| VANDIUM, wppm | 264 |
| FEED DENSITY, g/ml | 1.0367 |

TABLE 3-continued

Properties of the feed used to evaluate the catalysts

| n-C7 Insolubles, wt % | 8.0 |
|---|---|
| n-C5 Insolubles, wt % | 12.6 |

TABLE 4

Processes conditions used to evaluate the catalysts

| Catalyst LHSV, $hr^{-1}$ | 0.22 |
|---|---|
| Total pressure, psia | 2310 |
| H$_2$/Oil ratio, scft/bbl | 2750 |
| Temperature, ° F. | 775 |

TABLE 5

Relative performance of Catalyst A and Catalyst B

| Catalyst | Catalyst A | Catalyst B |
|---|---|---|
| 1050 F. conversion | base | 100 |
| 950 F.+ conversion | base | 100 |
| Relative 660 F.+ Sediments | base | 43% of base |
| HDS activity | base | 98% of base |

While the results presented in Table 5 show that the trilobe-shaped catalyst exhibits slightly different desulfurization activity than that of the cylinder-shaped catalyst, what is significant and unexpected, however, is that the trilobe-shaped catalyst provides for significant improvements in sediment yield. The sediment yield provided with the trilobe-shaped catalyst is 43% of the sediment yield provided with the cylindrical-shaped catalyst. The trilobe-shaped catalyst particle with its significantly higher ratio of cross section perimeter-to-cross sectional area than that of the cylindrical particle (i.e., 6.5 $mm^{-1}$ versus 4.08 $mm^{-1}$) contributes to the observed reduction in sediment yield.

The invention claimed is:

1. A process that uses an ebullated bed reactor system for the hydroconversion of a heavy hydrocarbon feedstock providing for the conversion of said heavy hydrocarbon feedstock with a low sediment yield, wherein said process comprises:

introducing said heavy hydrocarbon feedstock into an ebullated bed reaction zone contained within a reactor volume defined by an ebullated bed reactor vessel, wherein said reactor volume includes an upper zone above said ebullated bed reaction zone and a lower zone below said ebullated bed reaction zone; and wherein said ebullated bed reaction zone comprises a catalyst bed of shaped hydroprocessing catalyst particles having a macroporosity of greater than 10% and a geometry, wherein said shaped hydroprocessing catalyst particles have a trilobed shape including a trilobed particle length and a nominal trilobed diameter, and wherein said geometry provides for a first ratio of the cross section perimeter-to-cross sectional area that is in the range of from 5 $mm^{-1}$ to 8 $mm^{-1}$, and a second ratio of the particle external surface area divided by the particle volume in the range of from 5 $mm^{-1}$ to 15 $mm^{-1}$;

contacting under hydroconversion reaction conditions, including a contacting temperature in the range of from 316° C. (600° F.) to 538° C. (1000° F.), a contacting pressure in the range of from 500 psia to 6,000 psia, a hydrogen-to-oil ratio in the range of from 500 scf/bbl to 10,000 scf/bbl, and liquid hourly space velocity (LHSV) in the range of from 0.1 hr$^{-1}$ to 5 hr$^{-1}$, said heavy hydrocarbon feedstock with said shaped hydroprocessing catalyst particles within said ebullated bed reaction zone; and yielding from said upper zone a heavy hydrocarbon conversion product having a low sediment content of less than 0.5 wt % as determined by testing method ASTM-4870.

2. A process as recited in claim 1, wherein said trilobe shape is characterized by a trilobe cross section having a perimeter that is defined by three circles each having a center and a radius (r), wherein said radii of each of said three circles are equal in length, and wherein said centers of each of said three circles are oriented in a spaced relationship to each other such that the distances between each said center of said three circles are equal, and wherein the distances between each said center of said three circles are in the range of from one radius (r) to two radii (2r).

3. A process as recited in claim 2, wherein said nominal trilobe diameter of said trilobe shape is the sum of the distance between each said center of said three circles and two radii (2r).

4. A process as recited in claim 3, wherein said radius is in the range of from 0.1 mm to 1 mm.

5. A process as recited in claim 4, wherein said nominal trilobe diameter is in the range of from 0.5 mm to 1.5 mm.

6. A process as recited in claim 5, wherein said trilobe particle length is in the range of from 0.1 mm to 5 mm.

7. A process that uses an ebullated bed reactor system for the hydroconversion of a heavy hydrocarbon feedstock providing for the conversion of said heavy hydrocarbon feedstock with a low sediment yield, wherein said process comprises:

introducing said heavy hydrocarbon feedstock into an ebullated bed reaction zone contained within a reactor volume defined by an ebullated bed reactor vessel, wherein said reactor volume includes an upper zone above said ebullated bed reaction zone and a lower zone below said ebullated bed reaction zone; and wherein said ebullated bed reaction zone comprises a catalyst bed of shaped hydroprocessing catalyst particles having a macroporosity of greater than 10% and a geometry, wherein said shaped hydroprocessing catalyst particles have a trilobed shape including a trilobed particle length and a nominal trilobed diameter, and wherein said geometry provides for a first ratio of the cross section perimeter-to-cross sectional area that is in the range of from 5 mm$^{-1}$ to 8 mm$^{-1}$, and a second ratio of the particle external surface area divided by the particle volume in the range of from 5 mm$^{-1}$ to 15 mm$^{-1}$, wherein said trilobe shape is characterized by a trilobe cross section having a perimeter that is defined by three circles each having a center and a radius (r), wherein said radii of each of said three circles are equal in length, and wherein said centers of each of said three circles are oriented in a spaced relationship to each other such that the distances between each said center of said three circles are equal, and wherein the distances between each said center of said three circles are in the range of from one radius (r) to two radii (2r), wherein said nominal trilobe diameter of said trilobe shape is the sum of the distance between each said center of said three circles and two radii (2r), wherein said radius is in the range of from 0.1 mm to 1 mm, wherein said nominal trilobe diameter is in the range of from 0.5 mm to 1.5 mm, wherein said trilobe particle length is in the range of from 0.1 mm to 5 mm, wherein said shaped hydroprocessing catalyst particles comprise an extrudate of a co-mulled mixture, comprising an inorganic oxide powder, a molybdenum compound and a nickel compound, wherein said extrudate has been calcined to provide said shaped hydroprocessing catalyst particles, and wherein said shaped hydroprocessing catalyst particles have a molybdenum content in the range of from 3 wt. % to 15 wt. %, a nickel content in the range of from 0.5 wt. % to 6 wt. %, and said inorganic oxide in the range of from about 75 wt. % to 96 wt. %, wherein each wt. % is based on the total weight of said shaped hydroprocessing catalyst particle and the metal as an oxide regardless of its actual form;

contacting under hydroconversion reaction conditions, including a contacting temperature in the range of from 316° C. (600° F.) to 538° C. (1000° F.), a contacting pressure in the range of from 500 psia to 6,000 psia, a hydrogen-to-oil ratio in the range of from 500 scf/bbl to 10,000 scf/bbl, and liquid hourly space velocity (LHSV) in the range of from 0.1 hr$^{-1}$ to 5 hr$^{-1}$, said heavy hydrocarbon feedstock with said shaped hydroprocessing catalyst particles within said ebullated bed reaction zone; and yielding from said upper zone a heavy hydrocarbon conversion product having a low sediment content of less than 0.5 wt % as determined by testing method ASTM-4870.

8. A process as recited in claim 7, wherein said shaped hydroprocessing catalyst particles further are characterized as having a macroporosity exceeding 12% of the total pore volume of said shaped hydroprocessing catalyst particles is in the pores having a diameter greater than 350 Å.

9. A process as recited in claim 8, wherein said hydroconversion reaction conditions include a contacting temperature in the range of from 316° C. (600° F.) to 510° C. 950° F.), a contacting pressure in the range of from 1000 psia to 3500 psia, a hydrogen-to-oil ratio in the range of from 500 scf/bbl to 10,000 scf/bbl, and liquid hourly space velocity (LHSV) in the range of from 0.2 hr$^{-1}$ to 4 hr$^{-1}$.

* * * * *